US008434117B2

(12) United States Patent
de Heer et al.

(10) Patent No.: US 8,434,117 B2
(45) Date of Patent: Apr. 30, 2013

(54) TUNERLESS MEDIA PRESENTATION UNIT AND METHODS OF USE

(75) Inventors: David L. de Heer, Woodside, CA (US); James A. Baldwin, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 1182 days.

(21) Appl. No.: 11/057,477

(22) Filed: Feb. 14, 2005

(65) Prior Publication Data
US 2006/0184973 A1   Aug. 17, 2006

(51) Int. Cl.
*H04N 7/173* (2011.01)
(52) U.S. Cl.
USPC ............... 725/86; 725/87; 725/93; 725/94; 725/95
(58) Field of Classification Search ............... 725/1, 4, 725/38, 40, 59, 95
See application file for complete search history.

(56) References Cited

U.S. PATENT DOCUMENTS

| 5,872,588 | A * | 2/1999 | Aras et al. ............... 725/14 |
| 7,047,547 | B2 * | 5/2006 | Alten et al. ............... 725/28 |
| 7,266,835 | B2 * | 9/2007 | Halbert ............... 725/40 |
| 7,373,650 | B1 * | 5/2008 | Rodriguez et al. ............... 725/41 |
| 2004/0070593 | A1 * | 4/2004 | Neely et al. ............... 345/716 |
| 2004/0215691 | A1 * | 10/2004 | Maria Van De Ven et al. ............... 709/200 |
| 2005/0289623 | A1 * | 12/2005 | Midani et al. ............... 725/100 |
| 2006/0293026 | A1 * | 12/2006 | Foll et al. ............... 455/406 |
| 2007/0011702 | A1 * | 1/2007 | Vaysman ............... 725/45 |
| 2009/0077255 | A1 * | 3/2009 | Smith et al. ............... 709/231 |
| 2009/0199249 | A1 * | 8/2009 | Rodriguez et al. ............... 725/91 |
| 2011/0314501 | A1 * | 12/2011 | Vaysman et al. ............... 725/41 |

OTHER PUBLICATIONS

U.S. Appl. No. 60/647,287.*
"Answers to Common Interactive Television (ITV) Questions," available at <<http://www.itvdictionary.com/set-top_box.html>>, accessed on Nov. 8, 2005, 6 pages.

* cited by examiner

*Primary Examiner* — Nasser Goodarzi
*Assistant Examiner* — Fred Peng
(74) *Attorney, Agent, or Firm* — Lee & Hayes, PLLC

(57) ABSTRACT

A tunerless media presentation unit is described which dispenses with the use of traditional analog television tuners. In its place, the media presentation unit provides a pseudo-tuner which can selectively access streaming digital media information from a multicast and/or unicast network source, and/or a local source. In one implementation, the media presentation unit can simultaneously receive and process multiple streams of media information. This accommodates the use of multiple picture-in-pictures (PIPs), PIP-based channel browsing, PIP-in-guide presentations, and so forth. Various business models can be implemented which charge subscribers fees based on the number of streams they wish to simultaneously receive, and/or the total number of channels that they wish to access (not necessarily at the same time).

16 Claims, 6 Drawing Sheets

US 8,434,117 B2

TUNERLESS MEDIA PRESENTATION UNIT AND METHODS OF USE

TECHNICAL FIELD

This subject matter relates to functionality and methods for presenting digital media information. In a more particular implementation, this subject matter relates to a television for presenting digital media information, and to accompanying business models for using such a television.

BACKGROUND

Conventional television sets use a physical analog tuner section for receiving RF-modulated signals from wireless broadcasts or from set-top boxes. FIG. 1 shows an overview of one such conventional tuner module 102. The tuner module 102 includes an RF amplifier for amplifying RF-modulated signals from a wireless source (such as a terrestrial antenna). A mixer mixes the RF-modulated signal with a signal supplied by a local oscillator to produce an intermediate frequency (IF) signal. In a manner well known in the art, a user can select a channel (and corresponding frequency) by controlling an input signal fed to the local oscillator 108. An IF amplifier 110 amplifies the IF signal. A video detector/VSB demodulator demodulates the video signal component of the signal fed into it. A YUV to RGB converter 114 converts the resultant signal from a luma-related color space (e.g., YUV) to an Red Green Blue (RGB) format for output to a display device 116 (which typically comprises a CRT-based device having phosphors that are driven by the R, G and B components of the resultant video signal). A sync separator 118 supplies timing information which governs the operation of the display device 116. As to the audio component of the input signal, an FM audio demodulator 120 demodulates the audio component of the input signal and sends the resultant signal to a speaker device 122. Commonly, a television set will include a single tuner module 102, or, on some cases, two such tuner modules.

Analog tuner modules of the type described above have a number of drawbacks. First, these tuners are typically expensive. Second, these tuners are commonly constructed from discrete electrical components, and are thus single-use modules that cannot easily be adapted to perform other tasks. For instance, a single analog tuner module can only process one channel at a time. This places limitations on the capabilities of the television set which uses such a tuner, and also places significant constraints on the business models used to deliver media information to users. Third, and obviously, analog tuner modules cannot directly accommodate the processing of signals that are not modulated by respective different frequencies.

For at least the above-identified reasons, there is an exemplary need for more satisfactory tuner module designs and associated business methods for utilizing these designs.

SUMMARY

According to one exemplary implementation, an integrated media presentation unit is described which lacks traditional analog frequency-based tuners. The integrated media presentation unit comprises, among other components: (a) an interface module for receiving media information from one or more sources to produce received media information; (b) an audio-visual (AV) decoder for decoding the received media information to produce decoded media information, wherein the AV decoder is configured to process plural streams of received media information at the same time based on at least one business-related criterion; (c) an audio-visual (AV) control module for controlling the operation of the audio-video decoder; (d) a user interface module that allows a user to interact with the AV control module, to thereby provide instructions to the AV control module; (e) a display output device for presenting visual content of the decoded media information; and (f) an audio output device for presenting audio content of the decoded media information.

Additional exemplary implementations are described in the following.

Figure 1:
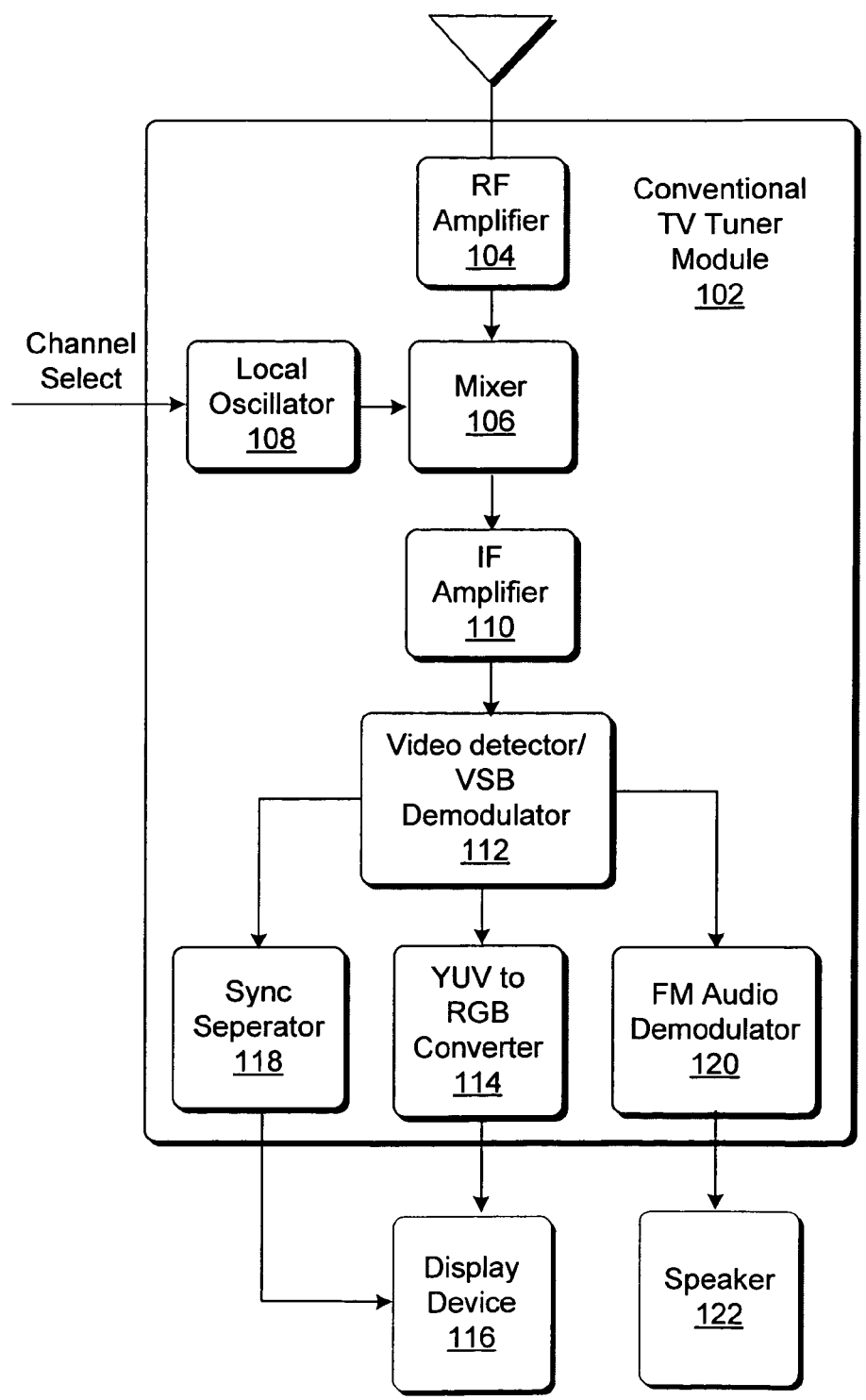
FIG. 1 shows a conventional tuner module used to process RF signals.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth a "tunerless" media presentation unit (e.g., a tunerless television set). As the name suggests, the media presentation unit does not have a conventional analog tuner module that extracts media signals modulated at different respective frequencies. Instead, the media presentation unit includes components for accessing and processing a digital stream of media information from a larger collection of such streams. In this sense, the media presentation unit can be said to employ a "pseudo-tuner" which accesses particular media information of interest, such as by "tuning to" and processing a prescribed digital stream of media information (e.g., in one case, by joining an associated multicast group). However, the use of the term "pseudo-tuner" or "tuning" in this context has been expanded, as the pseudo-tuner does not physically extract signals presented at different frequencies in the original sense of the term tuner.

According to another exemplary feature, the elimination of a physical analog tuner accommodates new business models. According to one business model, the media presentation unit can simultaneously present multiple programs by employing multiple pseudo-tuners. This enables the user, for example, to watch multiple sporting events at the same time.

According to another business model, the media presentation unit can provide picture-in-picture (PIP) channel browsing, or can provide reduced-resolution browsing of video-on-demand (VOD) resources (e.g., movies).

According to another business model, the media presentation unit can integrate PIPs in its user interface presentations, such as in its graphical channel guides.

According to another business model, the media presentation unit can allow the user to dynamically add one or more pseudo-tuners to the media presentation unit. For example, a provider of media information may allow the user to add one or more pseudo-tuners for a prescribed fee. A user may wish to add one or more pseudo-tuners to accommodate a change in needs, such as desire to watch plural games during a particular sporting season.

According to another business model, a provider of media information can charge fees based on the number of channels (or, more generally, programs) that the user is permitted to receive (e.g., "listen to"). Theoretically, however, the media presentation unit 200 can receive an unlimited number of channels, as these channels are not assigned to a limited frequency space as in the traditional case of broadcast wireless delivery of TV signals.

According to another business model, the media presentation unit can receive input signals from a versatile array of sources, such as one or more network sources, one more local sources (such as a local personal computer, DVR, and so forth), etc. This feature allows a variety of devices to be coupled to the television set without requiring complicated wiring and specialized interface mechanisms.

The strategies described herein confer a number of benefits. According to one benefit, the elimination of a physical analog tuner potentially makes the media presentation unit less expensive. According to another benefit, pseudo-tuners which receive streams of media information are more versatile than traditional analog tuners, as they can be dynamically reconfigured to accommodate different business needs and customer preferences (e.g., by configuring the pseudo-tuners to receive a variable number of streams). Further, as noted, a tunerless media presentation unit can be coupled to a wide variety of sources of digital information without complex and specialized wiring and interface mechanisms.

Additional features and attendant benefits of the strategies will be set forth in this description.

As to terminology, the term "media information" refers to any data represented in electronic form that can be consumed by a user. The media information can include any information that conveys audio and/or video information, such as audio resources (e.g., music, etc.), still picture resources (e.g., digital photographs, etc.), moving picture resources (e.g., audio-visual television programs, movies, etc.), computer programs (e.g., games, etc.), and so on. The media information may include, or may omit, interactive content. The media information can be delivered according to a fixed schedule, or on an On-Demand basis (e.g., VOD delivery). The media information can be delivered free of charge, or using any kind of fee-based business model.

The term "pseudo-tuner," or the terms "tune" or "tuning" (i.e., when placed in quotes), refers to the accessing of one or more digital streams of media information from a larger collection of such streams. More specifically, these terms are meant to distinguish tunerless reception from conventional tuners which use analog equipment for extracting signals modulated using different physical frequencies.

The term "media presentation unit" refers to any integrated unit for processing and presenting media information. In the most common case evoked in this discussion, the media presentation unit comprises a television set. In the manner of "cable-ready" television sets, this disclosure sets forth a television set which includes internal components for receiving and processing streams of digital information (e.g., received via a network or local source) without specialized interface mechanisms. The television set can be "plugged into" an appropriate conduit of digital information to then immediately receive media information.

The term "consumer-allocated data bandwidth" (or simply "bandwidth" for brevity below) refers to a maximum bit rate that can be used to transmit media information to the media presentation unit from a source of such information. For instance, a head-end infrastructure may allocate a prescribed amount of bandwidth to a household for its use in receiving the media information (where the bandwidth may ultimately reflect the respective capacities of the equipment used to implement the communication channel that couples the head-end infrastructure to the household). In addition, or alternatively, the head-end infrastructure could potentially throttle the available bandwidth based on business considerations (rather than the physical limitations of the communication channel). In any event, the term bandwidth refers to the bit rate available to the media presentation units in the household, rather than the amount of "back end" bandwidth available to the head-end infrastructure itself to implement its services.

This disclosure includes the following sections. Section A explains an exemplary structural composition of the tunerless media presentation unit, as well as a system in which such a media presentation unit can be employed. Section B presents various business models that can utilize the tunerless media presentation unit. And Section C presents a flowchart which describes the manner of operation of the tunerless media presentation unit.

A. Exemplary Structural Composition

Generally, any of the functions described with reference to the figures can be implemented using software, firmware (e.g., fixed logic circuitry), manual processing, or a combination of these implementations. The term "logic", "module" or "functionality" as used herein generally represents software, firmware, or a combination of software and firmware. For instance, in the case of a software implementation, the term "logic," "module," or "functionality" represents program code that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Exemplary Tunerless Media Presentation Unit

Figure 2:
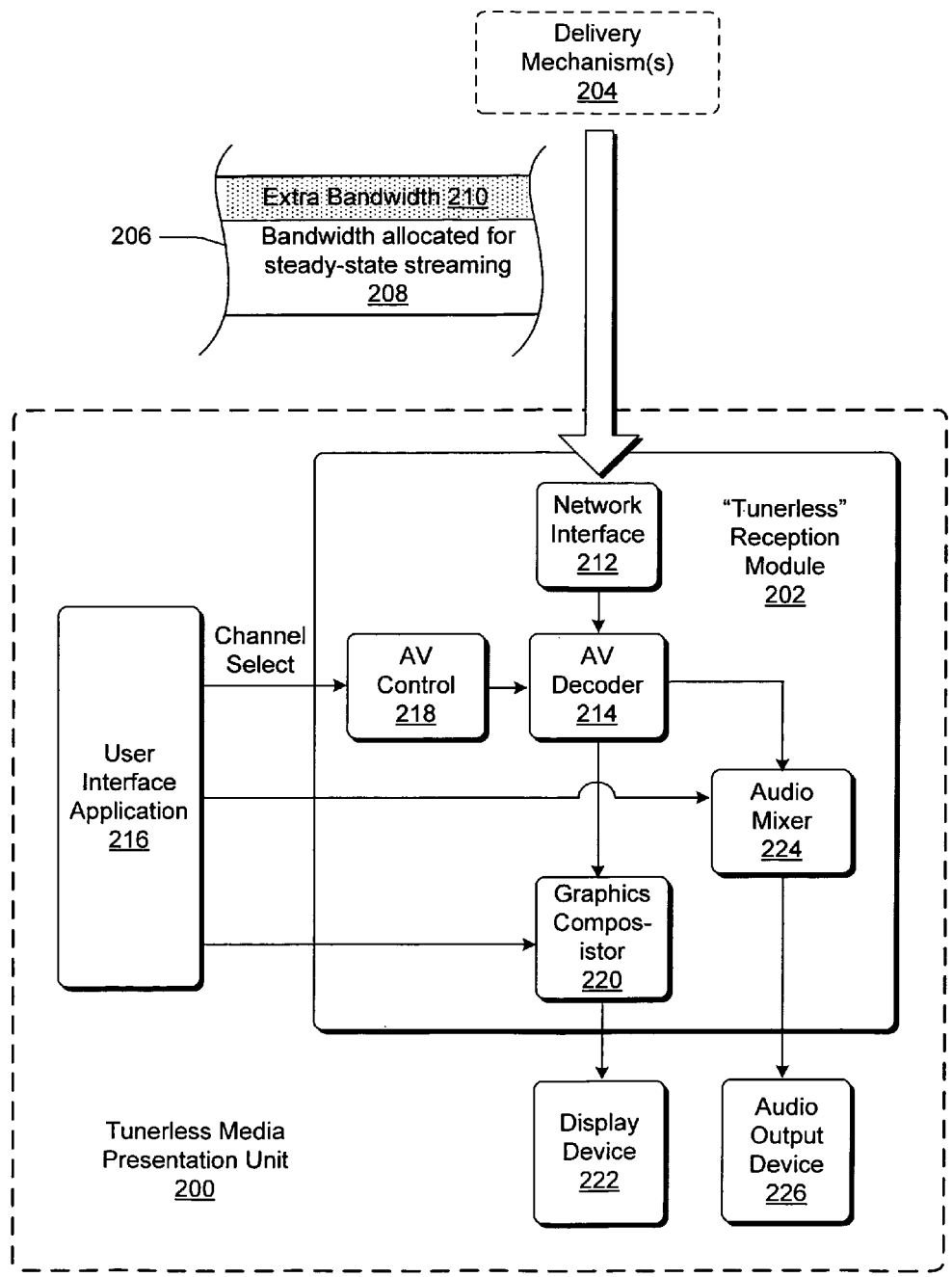
FIG. 2 shows an exemplary media presentation unit that uses a "tunerless" reception module for processing digital media information.

FIG. 2 shows one exemplary implementation of a tunerless media presentation unit 200. The media presentation unit 200 includes a tunerless reception module 202. However, in accordance with the terminology developed above, this reception module 202 can also be referred to a pseudo-tuner in the sense that it performs the role previously provided by a conventional analog tuner, but without extracting signals at different frequencies.

Figure 3:
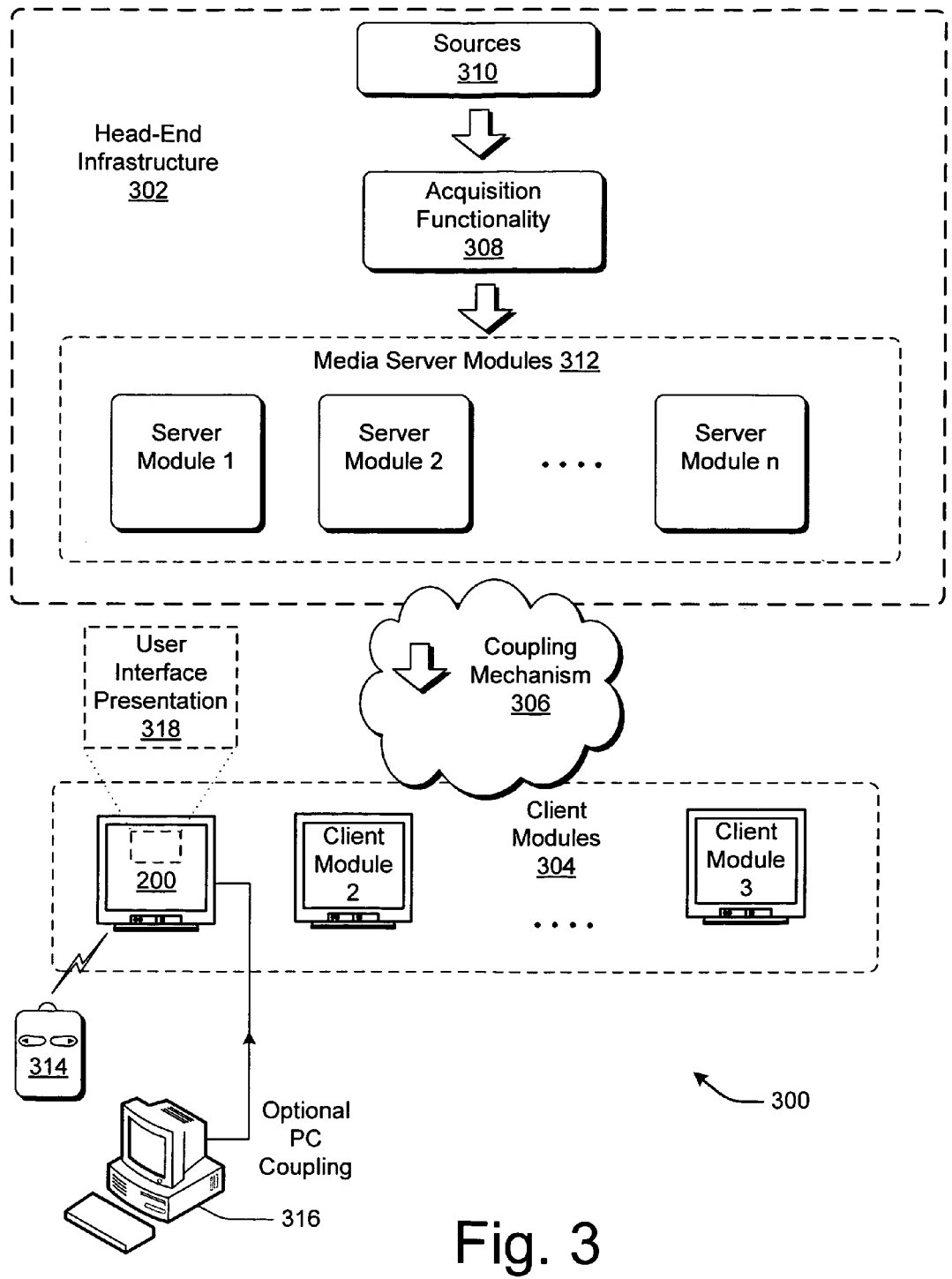
FIG. 3 shows an exemplary system that can employ the media presentation unit of FIG. 2.

The media presentation unit 200 accepts digital media information via one or more delivery mechanisms 204 (referred to as a singular delivery mechanism 204 hereinafter for convenience). In one case, the delivery mechanism 204 may represent head-end infrastructure used to deliver the media information to the media presentation unit 200 via a network connection. FIG. 3, to be discussed in turn, provides further details regarding one exemplary implementation of such head-end infrastructure. Alternatively, the delivery mechanism 204 can represent equipment that is locally situated relative to the media presentation unit 200. For example, the delivery mechanism 204 can represent a personal computer, a digital video recorder (DVR), or other source of media information.

The delivery mechanism 204 uses a communication channel 206 to deliver media information to a particular media presentation unit 200. This illustrative communication channel 206 includes a prescribed amount of consumer-allocated data bandwidth (referred to for brevity below as simply "bandwidth") allocated to the task of streaming media information to the media presentation unit 200. In one exemplary implementation, the delivery mechanism 204 delivers the media information at a constant bit rate. In another exemplary implementation, the delivery mechanism 204 delivers the media information at a variable bit rate that is capped by a prescribed maximum bit rate. In any case, the communication channel 206 can devote a prescribed amount of bandwidth 208 for streaming the media information in a steady-state or nominal condition. Such prescribed amount of consumer-allocated bandwidth 208 can accommodate the delivery of plural identified streams of media information that the media presentation unit 200 is coupled to receive (e.g., by tuning to these streams in multicast fashion or some other fashion). This enables a single media presentation unit 200 to potentially extract multiple streams of media information using the channel 206 for simultaneous presentation, such as in the scenario in which the user desires to watch plural programs in different panels of the media presentation unit 200's display device. In another case, the communication channel 206 can provide plural streams for reception by different media presentation units within a household which "feed off" the same channel 206.

In addition, the communication channel 206 may devote a portion of its allocated bandwidth 210 for handling special overhead tasks. One such overhead task can involve the delivery of media information at an above-nominal data rate for a short period of time when the user first "tunes" to a particular media presentation program. This is advantageous to allow the media presentation unit 200's buffer (not shown) to quickly fill up. This, in turn, allows the media presentation unit 200 to more quickly present the media information upon "switching" to it. Another overhead task can involve the receipt of retry requests from the tunerless media presentation unit 200 and the supply of retry media information (i.e., missing packets) in response to these requests.

The media information itself can be expressed in any format, including, but not limited to, the MPEG-2 standard. Other formats include Microsoft Corporation's VC-1 standard and the ISO/ITU H.264 standard, among others. The MPEG-2 coded media information can be encapsulated into packets using any format, including, but not limited to, the Real Time Transport Protocol (RTP), the Real Time Streaming Protocol (RTSP), the Advanced Streaming Format (ASF), and so forth. The above-described above-nominal burst of media information is preferably configured to start at a key frame (e.g., in the MPEG-2 standard, an I frame, rather than a B or P frame). This better ensures that the media presentation unit 200 can quickly begin presenting the media information in an unproblematic manner (because, otherwise, the media presentation unit 202 would need to wait for the occurrence of a key frame in the stream of media information).

The delivery mechanism 204 can deliver media information to the media presentation unit 200 using different packaging paradigms. In one case, the delivery mechanism 204 can supply a sequence of programs to users in different channels (although, again, the channels do not have the frequency-specific connotation of tradition systems). In this mode, the delivery mechanism 204 can present the programs according to a fixed schedule, in the manner of traditional delivery of channels. In another case, the delivery mechanism 204 can supply individual programs to users at fixed times. In a VOD-related case, the delivery mechanism 204 can deliver individual media programs to a user whenever the user requests the programs. Still other program packaging paradigms are possible.

The media presentation unit 202 itself includes a network interface module 212. The network interface module 212 can represent any functionality for receiving media information from the delivery mechanism 204 using any coupling mechanism. For example, the network interface module 212 can comprise an Ethernet NIC, a DSL modem, a cable modem, a wireless network interface, or other kind of network interface equipment.

An audio-visual (AV) decoder 214 decodes (and decompresses) the received media information into its video and audio components. Decoding comprises ordering packets (if received out of order), extracting media information from the stream of received packets, and also extracting timing information that will govern the playback of the media information.

As mentioned above, the media presentation unit 200 employs a buffer (not shown). The media presentation unit 200 pulls media information from the buffer on a FIFO basis for decoding. This introduces a lag between receipt of the media information at the media presentation unit 200 and its subsequent processing. This feature is advantageous for a number of reasons, but mainly because it facilitates a steady presentation flow (e.g., because this lag allows the media presentation unit 200 to request any missing packets from the delivery mechanism 204 before the packets are consumed by the media presentation unit 200). But the use of a buffer can have the negative effect of introducing a delay at the commencement of media presentation (e.g., when the user first "tunes" to a channel), because the media presentation unit 200 may require that the buffer reach a prescribed state of fullness prior to the presentation of media information to the user. The above-nominal initial burst of media information described above enables the buffer to be filled up on an expedited basis, and thereby allows the media information to be presented to the user more quickly, to thereby partially mitigate the delay. In another implementation, however, the media presentation unit 200 can immediately begin presenting media information to the user without requiring that the buffer reach a prescribed state of fullness, with the negative consequence of potentially producing unsteady performance during the first few seconds of presentation.

Continuing on with an explanation of FIG. 2, a user interface application 216 in conjunction with an AV control module 218 controls the AV decoder 214. That is, the user interface application 216 may represent logic configured to receive the inputs of a user and forward these inputs to the reception module 202. For example, the user may input instructions to user interface application 216 via any kind of input mechanism (e.g., a remote controller) in conjunction with a user interface presentation displayed by the media presentation unit 200. The AV control module 218 translates these input instructions into a form that is "understood" by the AV decoder 214.

Consider the exemplary case where a user switches channels on the tunerless presentation unit 200, or otherwise selects a program. This prompts the user interface application 216 to forward channel or program change information to the AV control module 218. The AV control module 218, in turn, consults a channel map to translate the channel or program information supplied by the user interface application 216 to a form that can be understood by the AV decoder 214. This allows the AV decoder 214 to "tune" to the desired channel or program.

For example, assume that the delivery mechanism 204 provides the media information via a multicast technique, such as, but not limited to, the Internet Group Management Protocol (IGMP). In the IGMP technique, the media information is broadcast to a group of recipients by a tree of distribution nodes which receive the resource information from an ultimate source. The media presentation unit 200 can join the ongoing multicast by tapping into the multicast distribution; it can perform this task by locating an appropriate distribution node within the tree of such nodes. In this configuration, the AV control module 218 can instruct the AV decoder 214 where it can "tap into" such a multicast distribution. Alternatively, assume that the delivery mechanism 204 provides the media information via a unicast technique. In the unicast technique, the media information is delivered to the particular media presentation unit 204 in one-to-one fashion (rather than multicast or broadcast). In this configuration, the AV control module 218 can instruct the AV decoder 214 where it can receive such a unicast distribution (e.g., which may identify a server machine which provides the unicast stream of media information).

A graphics compositor 220 combines the video component of the media information from the AV decoder 214 on a frame-by-frame basis with graphics information supplied by the user interface application 216 or other source. The graphics information may comprise various user interface presentations which are overlaid on the media information. For each frame, the result of the compositing operation comprises combined video and graphics information which is stored in a frame buffer. The reception module 202 then converts the resultant media information to a desired output format (such as by converting from YUV to RGB), and then forwards the converted media information to a display device 222 (such as a cathode ray tube, LCD type output device, plasma type output device, etc.).

Similarly, an audio mixer 224 combines an audio component of the media information received from the AV decoder 214 on a sample-by-sample basis with the supplemental audio information received from the user interface application 216 or other source. The audio mixer 224 then outputs the combined audio to an audio output device 226 (e.g., a speaker or speakers).

The above-described components of the media presentation unit 200 can be contained in a single physical housing and marketed as an "IP-ready" unit (e.g., as a unit that can be simply "plugged into" an appropriate network interface without complicated coupling provisions). For instance, the media presentation unit 200 can dispense with the use of a set-top box, modem devices, and so forth. Other media processing functionality can adopt a similar design. For instance, a digital video recorder (DVR) can incorporate one or more features of the above-described media presentation unit 200 within a single physical housing. Or a digital video disc rewritable (DVD-RW) unit can incorporate one or more features of the above-described media presentation unit 200 within a single physical housing. These are merely illustrative non-limiting examples. Or a media presentation unit 200 can integrate any combination of a television set, a DVR, a DVD-RW, and any other device, within a single physical housing.

A.2. Exemplary System for Interacting with the Media Presentation Unit

FIG. 3 shows one exemplary system 300 among many possible systems that can utilize the tunerless media presentation unit 200 of FIG. 2. By way of overview, the system 300 defines head-end infrastructure 302 for delivering streams of resource information to a collection of client modules 304 via a coupling mechanism 306. The head-end infrastructure 302 represents one example of the delivery mechanism 204 introduced in FIG. 2. One or more of the client modules 304 can comprise the media presentation unit 200 of FIG. 2.

The head-end infrastructure 302 includes acquisition functionality 308 for supplying the resource information from one or more sources 310 of such information. The sources 310 can represent any kind of entity which produces or provides information, such as cable or satellite television providers, one or more Video-On-Demand (VOD) providers, one or more publishing houses of information, one or more library sources, any kind of Internet-enabled repository, and so on. The media information received from these sources 310 can include video, audio, still pictures, and/or other multimedia content. In general, the sources 310 can supply live information or prerecorded information. Live information corresponds to information that captures a current state of an ongoing event (such as a sporting event which is being televised live). Prerecorded information corresponds to information that has already been recorded in its entirety. The acquisition functionality 308 itself can comprise one or more server computers or other functionality dedicated to the task of retrieving the resource information and (optionally) storing the resource information prior to dissemination to the client modules 304.

The system 300 can use any kind of coupling mechanism 306 to couple the head-end functionality 302 to the client modules 304. For instance, the coupling mechanism 306 can include any kind of network (or combination of networks), such as a wide area network (e.g., the Internet), an intranet, Digital Subscriber Line (DSL) network infrastructure, point-to-point coupling infrastructure, and so on. The coupling mechanism 306 can use or involve any kind of protocol or combination of protocols. In the case where one or more digital networks are used to disseminate information, the coupling mechanism 306 can include various hardwired and/or wireless links, routers, gateways, name servers, and so on. In the case where DSL infrastructure is used to disseminate information, the coupling mechanism 306 can utilize the services, in part, of telephone coupling infrastructure and DSL processing functionality.

The system 300 can optionally use a collection of server modules 312 to facilitate the transmission of resource information to the client modules 304. The server modules 312 may provide redundant services, such that any of the server modules 312 can be assigned to provide the same service to any of the client modules 304.

Different systems may use the server modules 312 in different ways. One exemplary system may use the server modules 312 to transmit media information received from the acquisition functionality 308 or from some other source (e.g., from a VOD source) in unicast fashion. The server modules 312 can deliver media information in unicast fashion for the entire delivery of the media information or just an initial above-nominal burst of the delivery when the user first "tunes" to the media information. In the latter case, after receiving the initial above-nominal burst of unicast media information, the client modules 304 can switch over to receiving the same stream of media information via a multicast delivery technique (which is advantageous because it frees server resources). Another role performed by the server modules 312 is to receive retry requests from the client modules 304 and send retry packets to the client modules 304 in response to these requests. Commonly assigned U.S. patent application Ser. No. 11/010,200, entitled, "ACCELERATED CHANNEL CHANGE IN RATE-LIMITED ENVIRON- MENTS," naming as inventors Geoffrey R. Smith et al., filed on Dec. 10, 2004, issued as U.S. Pat. No. 7,477,653, provides further exemplary details regarding one exemplary protocol for delivering resource information. This patent application is incorporated by reference herein in its entirety.

As to the client modules 304, FIG. 2 has previously set forth the exemplary composition of one of the client modules in the form of the tunerless media presentation unit 200. FIG. 3 illustrates that this media presentation unit 200 can receive input via a remote controller device 314, as well as other types of input devices. FIG. 3 also shows that the media presentation unit 200 can also accept media information from alternative sources, such as a personal computer device 316, local store (not shown), DVR (not shown), and so forth. For example, the user may wish to supply home movies, photographs, music or other media content to the media presentation unit 200 via this route. As the television 200 is already equipped to process streams of digital information, the system 300 need not provide specialized coupling or interface mechanisms for connecting the computer device 316 and the media presentation unit 200.

Finally, FIG. 3 shows that the media presentation unit 200 can display a user interface presentation 318. This presentation 318 can take the form of a graphical overlay placed "on top" of a media information presentation (produced by the graphics compositor 220 of FIG. 2). Or the presentation 318 can consume the entire display surface of the media presentation unit 200. The logic and content used to provide the user interface presentation can be provided by the media presentation unit 200 itself, by the head-end infrastructure 302, or by a combination of the media presentation unit 200 and the head-end infrastructure 302.

To repeat, the system 300 shown in FIG. 3 represents just one of many streaming environments that can use the tunerless media presentation unit 200.

B. Exemplary Applications and Associated User Interface Presentations

The use of the tunerless media presentation unit 200 of FIG. 2 accommodates a number of new business models for delivering and consuming media information. This section sets forth some of the possible new business models and associated user interface presentations for implementing the business models.

Figure 4:
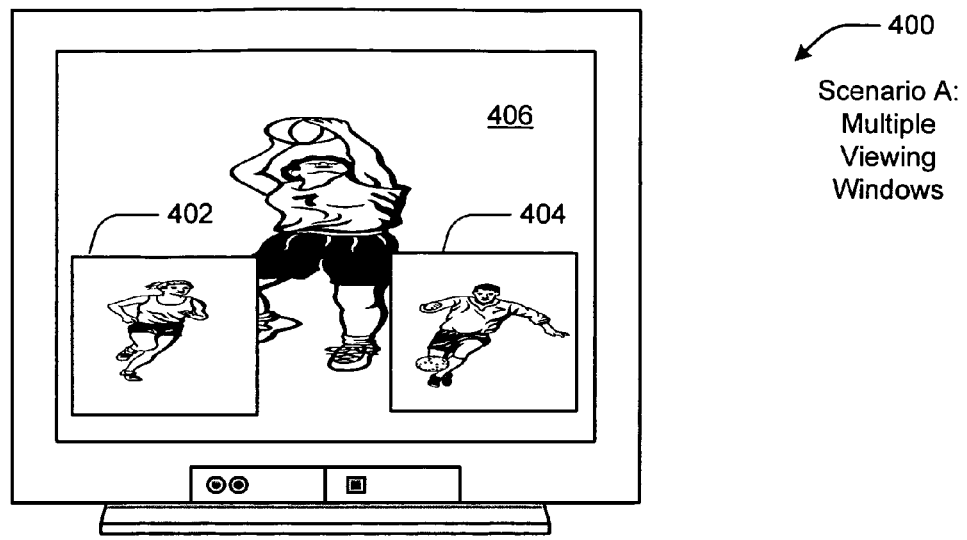
FIGS. 4-7 show exemplary user interface presentations associated with different business models that utilize the media presentation unit of FIG. 2.

FIG. 4 shows a user interface presentation 400 associated with a first business model. In this case, the media presentation unit 200 allows the user to display multiple picture-in-picture (PIPs) on the same display surface, such as PIP 402 and PIP 404, which both overlay a main media presentation 406. This business model can be implemented by allocating separate pseudo-tuners to each PIP (as well as the main media presentation). If effect, this means that the media presentation unit 200 is listening to multiple sources of media information at the same time, such as multiple multicast groups.

Figure 5:
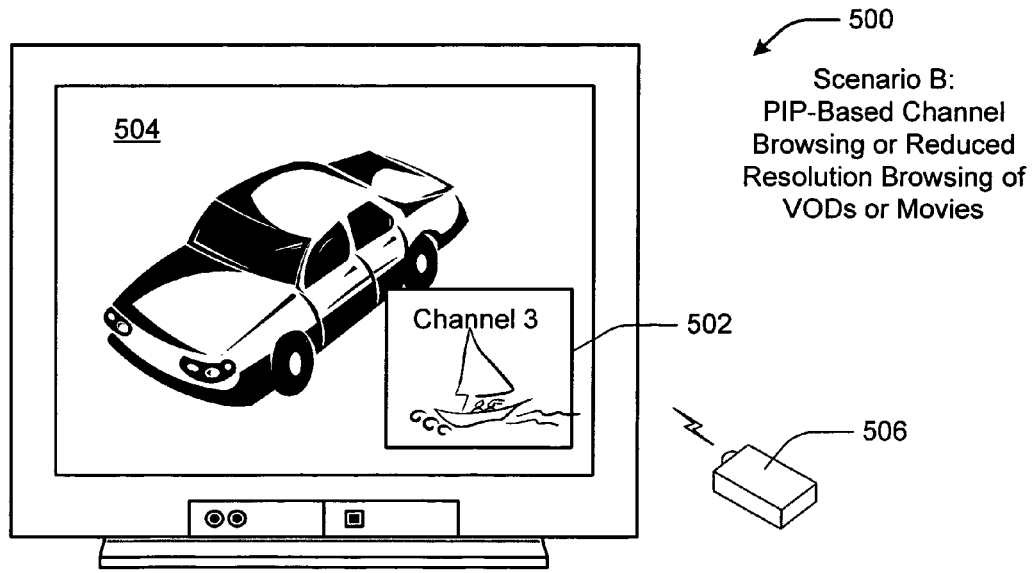

FIG. 5 shows a user interface presentation 500 associated with a second business model. In this case, the media presentation unit 200 allows the user to browse channels in a sub-panel PIP 502 which overlays the main media presentation 504. That is, the user can use a remote controller 506 or other input mechanism to scan channels (or generally, programs); the media presentation unit 200 responds by showing reduced-sized versions of the channels being scanned in the PIP 502. Similarly, this business model can be used to allow the user to review other content in the PIP 502, such as VOD sources (e.g., VOD movies), etc.

Figure 6:
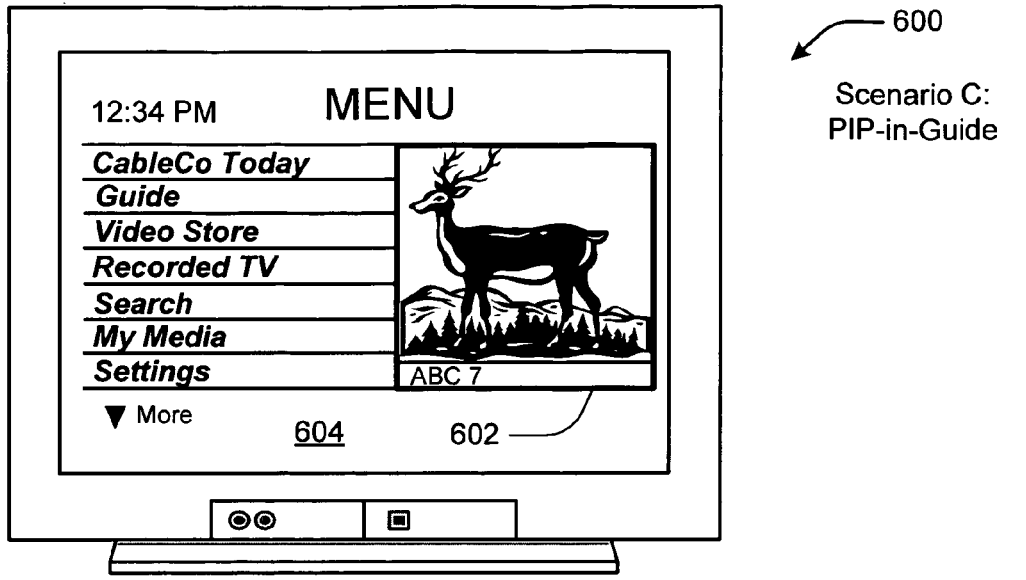

FIG. 6 shows a user interface presentation 600 associated with a third business model. In this case, the media presentation unit 200 provides a reduced-size PIP 602 that is integrated in a channel guide 604, or other user interface presentation. This business model provides more meaningful information to the user to enable the user to select a particular media program (e.g., as opposed to simply providing a textual description of the media program as is the case in traditional guides). FIG. 6 shows that the PIP 602 is integrated in a main menu type channel guide 604, but this kind of PIP (or plural such PIPs) can also be integrated into a guide (not shown) which provides a listing of available programs.

Figure 7:
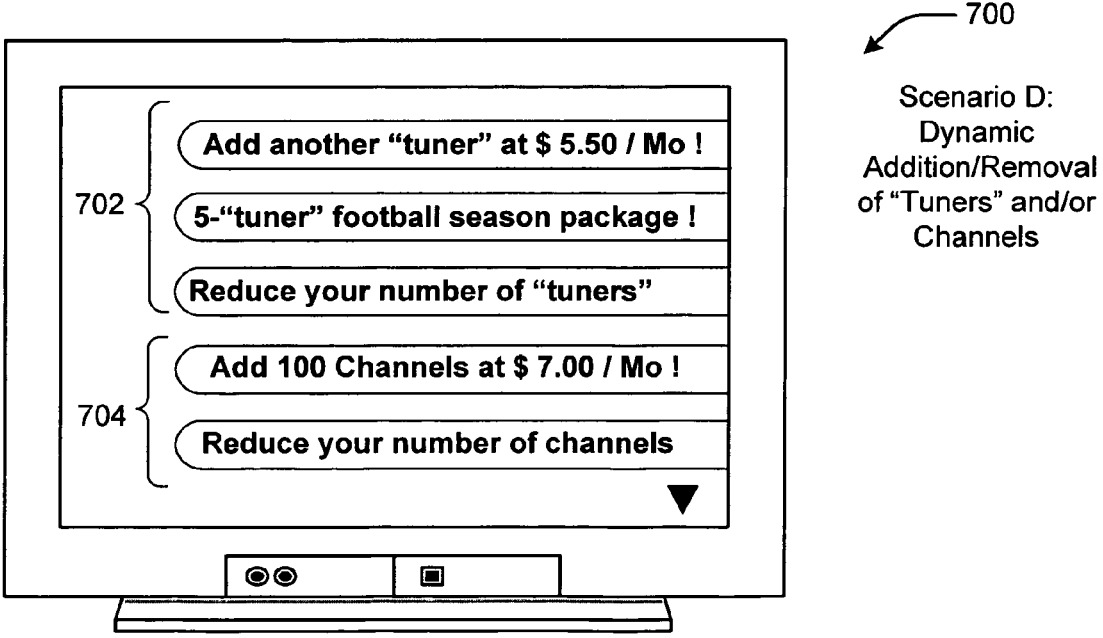

FIG. 7 shows a user interface presentation 700 associated with fourth and fifth business models. Beginning with the four business model, the media presentation unit 200 (and its supporting media delivery mechanism 204) allow a user to dynamically add or remove pseudo-tuners. For instance, a household may be allocated a communication channel having a prescribed bandwidth, which may accommodate the concurrent delivery of multiple independent streams of media information. Assume, in one exemplary and non-limiting case, that a particular media presentation unit 200 (or household that feeds off the same channel) can display a maximum of 15 streams at the same time, presented by 15 associated pseudo-tuners. The fourth business model provides a mechanism for determining how many of these 15 streams are actually made available to the user, or, stated in other words, how many of the pseudo-tuners are actively deployed. The mechanism for restricting the number of streams (and associated pseudo-tuners) can be implemented by logic in the media presentation unit 200 (or other module) which limits how many sources of media information that the reception module 202 can "listen to" at the same time.

One way of configuring the media presentation unit 200 to add or remove pseudo-tuners is via instructions transmitted to the media presentation unit 200 by the head-end infrastructure. More specifically, the user may contact the provider of the delivery mechanism 204 to request that the provider add or remove pseudo-tuners, and an automated mechanism or human administrator can forward appropriate instructions to the user's media presentation unit 200 which effectively configures it to receive and process the required number of concurrent streams of media information. In another example, the media presentation unit 200 itself may include a user interface presentation (such as command input field 702 of presentation 700), for allowing the user to dynamically add and remove pseudo-tuners via this presentation. In this case, the media presentation unit 200 can still forward appropriate control information to the head-end infrastructure 302 so that it can maintain appropriate accounting of the user's use of pseudo-tuners. Still other implementations of this feature are possible.

The fourth business model is advantageous from an economic standpoint because it allows a provider of media services to charge different rates depending on how many pseudo-tuners that a particular media presentation unit 200 (or household) is configured to carry. A user may be attracted to this option for various reasons, as it allows the user to increase and decrease the number of pseudo-tuners that they deploy depending on their time-varying needs. To provide one example, a user may want to configure the media presentation unit 200 to receive seven different concurrent streams during a sporting season, so as to allow the user to watch many different sporting events at the same time in a cluster of PIPs. But the user may wish to cut back on the number of pseudo-tuners after the end of the season. The logic which determines how many streams that the media presentation unit 200 can simultaneously present can be protected through suitable mechanisms to prevent the user from hacking into it and increasing the number of pseudo-tuners without paying the required fee.

In any of the above examples, the concept of "multiple pseudo-tuners" may correspond to a single AV decoder 214 which processes plural channels (or programs), e.g., by multiplex-processing these streams. Alternatively, the concept of multiple pseudo-tuners can be implemented by dynamically configuring the software of the media presentation unit 200 to provide (or enable) additional AV decoders 214 to extract and process corresponding streams of media information in parallel.

In the above model, different PIPs were allocated to different respective programs. As a variation of this concept, the consumer can subscribe to a single program or set of programs that include a package of streams associated therewith. A single sporting program, for example, may bundle together multiple streams that capture the same sporting event, but possibly at different angles (as captured by different cameras). In this model, multiple pseudo-tuners can be allocated to receiving the multiple streams associated with a single program. One marketing strategy is to give the consumer an option whether they wish to view the event using a conventional single-stream experience, or a multi-stream experience (where purchasing a media presentation having a single stream experience would be less expensive than the same presentation with multiple streams).

Another business model variation can permit a consumer to define a profile that determines the manner in which different streams of information are to be assembled together to provide a multi-PIP viewing experience. The profile can use any combination of criteria to govern such aggregation. In one case, a consumer can define a profile which selects: a) particular combinations of sources; b) particular placements of PIPs on the viewing screen; c) particular camera angles (when a program accommodates multiple views); d) particular events that may trigger the presentation and removal of PIPs in an event-conditional manner; and so forth. For example, one consumer may opt to view a game of the week on a main part of the presentation screen, while receiving clips of favorite players in supplemental PIPs when the players enter the game (e.g., when the players come up to bat in a baseball game). As a further feature, a learning engine can be employed (at the head-end and/or at the media presentation unit) to determine the user's viewing patterns, and then automatically combine media streams that match the user's assessed interests.

In the fifth business model, the provider of the delivery mechanism 204 can also limit the total number of channels (or, more generally, programs) that the media presentation unit 200 is allowed to access based on various fee-based schemes. For example, the user can charge a first fee for 100 channels, a second fee for 300 channels, third fee for 500 channels, and so forth. This business model can be implemented in a manner similar to the multi-tuner scenarios set forth above. For example, field 704 of presentation 700 shows one mechanism for allowing a user to add and remove channels via the client presentation unit 200 itself. The user's input via this field 704 can be forwarded to head-end infrastructure which enables or disables channels as appropriate based on the user's input, as well as addresses any accounting/billing issues associated with the modifications.

This business model allows the provider of the delivery mechanism 204 to pass down its costs which it may incur in gaining access rights to different providers (e.g., sources 310) of media information (which it supplies as separate channels or VOD programs). Theoretically, however, a pseudo-tuner employed by the media presentation unit 200 can access an unlimited number of channels by accessing different associated source addresses (e.g., multicast groups); thus, the constraints on the number of channels reflect business considerations, not technical considerations.

Still other business models using the media presentation unit 200 are envisioned. Moreover, the above-described business models are not mutually exclusive; that is, they can be combined together.

C. Exemplary Method of Operation

Figure 8:
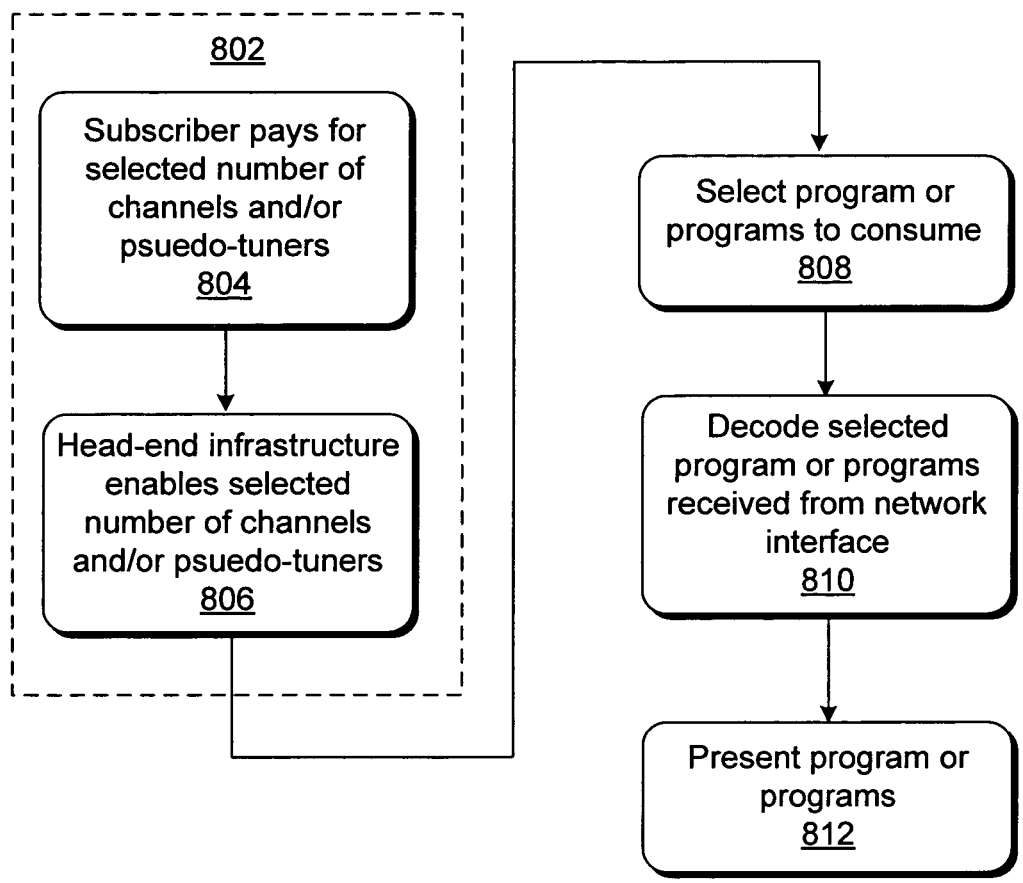
FIG. 8 shows an exemplary manner of using the media presentation unit of FIG. 2.

FIG. 8 describes the operation of the media presentation unit 200 within the context of an exemplary media delivery system (such as the system 300 of FIG. 3). To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. As the functions described in these flowcharts has already been explained in prior sections, Section C will serve primarily as a review of those functions.

In an initial phase 802, step 804 allows a user to determine how many channels that the media presentation unit 200 is configured to receive. Alternatively, or in addition, this step 804 allows the user to determine how many pseudo-tuners are to be activated within the media presentation unit 200. The use of multiple pseudo-tuners allows the media presentation unit 200 to simultaneously receive multiple streams of media information. Depending on the business model employed, a provider of media information may charge fees based on the number of enabled channels and/or the number of enabled pseudo-tuners. The user can enable/disable channels and "tuners" by manually contacting the provider of the delivery mechanism 204, or via appropriately configured client-end functionality (e.g., via the user interface presentation 700 of FIG. 7).

In step 806, the head-end infrastructure 302 enables the selected number of channels and/or pseudo tuners. In another implementation, changing the number of channels and/or pseudo tuners does not require the approval of the head-end infrastructure 302 (or at least does not require the immediate approval of the head-end infrastructure 302).

The remainder of the steps in FIG. 8 corresponds to the consumption of media information using the tunerless media presentation unit 200. In step 808, the user selects a channel or channels (or, more generally, selects a program or programs). To perform this step 808, the user can make a selection via the user interface application 216. This prompts the AV control module 218 to use a channel map to produce instructions to be sent to the AV decoder 214. The AV decoder 214 uses these instructions to "listen to" one or more locations, such as one or more multicast groups.

In step 812, the media presentation unit 200 presents the media information that the AV decoder 200 is "tuned" to receive. As previously described, this entails optionally performing graphical processing by combining video information with graphical information, the results of which are output to the display device 222. This also optionally entails performing audio mixing by combining received audio information with other sound information, the results of which are output to the audio output device 226.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A media presentation unit comprising:
   an audio-visual (AV) decoder for decoding media information received through a network communication channel to produce decoded media information, wherein the AV decoder is configured to process plural streams of received media information at a same time through a plurality of corresponding pseudo-tuners enabled on the AV decoder based on at least one business-related criterion, and
   a user interface module implemented by a processor to provide a user interface to dynamically add or remove one or more pseudo-tuners of the plurality of pseudo-tuners and to change the at least one business-related criterion, each pseudo-tuner accessing a digital stream of the media information from the one or more sources for enabling decoding of the plural streams of the media information by the AV decoder at the same time, wherein:
      a number of multiple streams that the AV decoder is able to decode at the same time is limited based on a number of pseudo-tuners currently enabled on the AV decoder, as specified through the user interface;
      the at least one business-related criterion pertains to a user agreement to pay fees to consume the plural streams of media information based on the number of pseudo tuners enabled on the media presentation unit during use of the user interface; and
      the plural streams pertain to plural respective views associated with a single program.

2. The media presentation unit of claim 1, wherein the AV decoder, user interface module, a display output device and an audio output device are integrated into a single housing.

3. The media presentation unit of claim 2, wherein the single housing defines:
   (a) a television set; or (b) a digital video recorder (DVR); or (c) a digital video disc rewritable (DVD-RW) device; or (d) any combination of (a)-(c).

4. The media presentation unit of claim 1, wherein the AV decoder receives the media information from a local source of information.

5. The media presentation unit of claim 1, further comprising a graphical compositor for combining visual content of the decoded media information with graphical information prior to output to a display output device.

6. The media presentation unit of claim 1, further comprising an audio mixer for combining audio content of the decoded media information with supplemental audio information prior to output to an audio output device.

7. The media presentation unit of claim 1, wherein the media presentation unit is configured to concurrently present the plural streams of received media information on a display output device in plural respective panels.

8. The media presentation unit of claim 1, wherein:
   the media presentation unit is configured to present a picture-in-picture (PIP) panel within a main presentation,
   the PIP panel allows a user to browse through a collection of programs by sequentially displaying the programs in response to program-change instructions while the user watches a main program displayed by the main presentation, and
   at any given time, the PIP panel presents one of the plural streams of received media information, and the main presentation presents another of the plural streams of received media information.

9. The media presentation unit of claim 1, wherein the media presentation unit is configured to present a picture-in-picture (PIP) panel within a channel guide user interface presentation, wherein the PIP panel presents one of the plural streams of received media information.

10. The media presentation unit of claim 1, wherein the plural streams further pertain to plural respective programs.

11. The media presentation unit of claim 1, wherein:
    the media presentation unit is also configured to limit a total number of streams that can be accessed based on at least one other business-related criterion, and
    the at least one other business-related criterion pertains to payment of fees to consume the total number of streams of media information based on the number of pseudo-tuners enabled through the user interface.

12. A method comprising:
    providing a user interface by a media presentation unit for a user to dynamically enable or disable one or more pseudo-tuners of plural pseudo-tuners available to be enabled on the media presentation unit, each pseudo-tuner enabled on the media presentation unit receiving a digital stream of media information of plural streams of media information delivered on a communication channel from one or more sources, so that a number of streams of media information available for access corresponds to a number of pseudo-tuners enabled on the media presentation unit;
    concurrently decoding, by the media presentation unit, the plural streams of received media information based on at least one fee-based business criterion to provide decoded media information, the plural streams pertaining to plural respective views associated with a single program, the decoding limiting the number of streams of media information that can be processed at a same time based on the at least one fee-based business criterion by limiting the number of pseudo-tuners enabled on the media presentation unit; and
    presenting, by the media presentation unit, the decoded media information to the user.

13. The method of claim 12, wherein the plural streams further pertain to plural respective programs.

14. One or more machine-readable media containing machine-readable instructions for implementing the method of claim 12.

15. A media presentation unit comprising:
    a tunerless reception module implemented by a processor for accessing one or more digital streams of media information from one or more sources, the tunerless reception module including:
    an audio-visual (AV) decoder for decoding the received media information to produce decoded media information, wherein the AV decoder is configured to process plural streams of received media information at the same time through a plurality of corresponding pseudo-tuners based on at least one business-related criterion, and
    an audio-visual (AV) control module for controlling the operation of the AV decoder; and
    a user interface module implemented by the processor that provides a mechanism for interacting with the AV control module to provide instructions to the AV control module for dynamically adding one or more pseudo-tuners to the plurality of pseudo-tuners in response to subscriber agreement, received through the user interface, to pay for the one or more added pseudo-tuners, each pseudo-tuner accessing a digital stream of media information from the one or more sources, so that a number of multiple pseudo-tuners enabled on the AV control module indicates a number of multiple streams of media information available for contemporaneous access by the media presentation unit, wherein:

the AV decoder limits the number of streams that can be processed at the same time based on at least one fee-based business criterion by limiting the number of multiple pseudo-tuners implemented on the media presentation unit; and the multiple streams pertain to plural respective views associated with a single program.

16. The media presentation unit of claim 15, wherein the user interface module is configured for a user to dynamically add one or more of the pseudo-tuners based on the at least one fee-based business criterion.

* * * * *